INVENTORS
Robert F. Maurer
Robert D. McVay
Donald L. Hummel
By
Mahoney, Miller & Stebens
By Robert E. Stebens

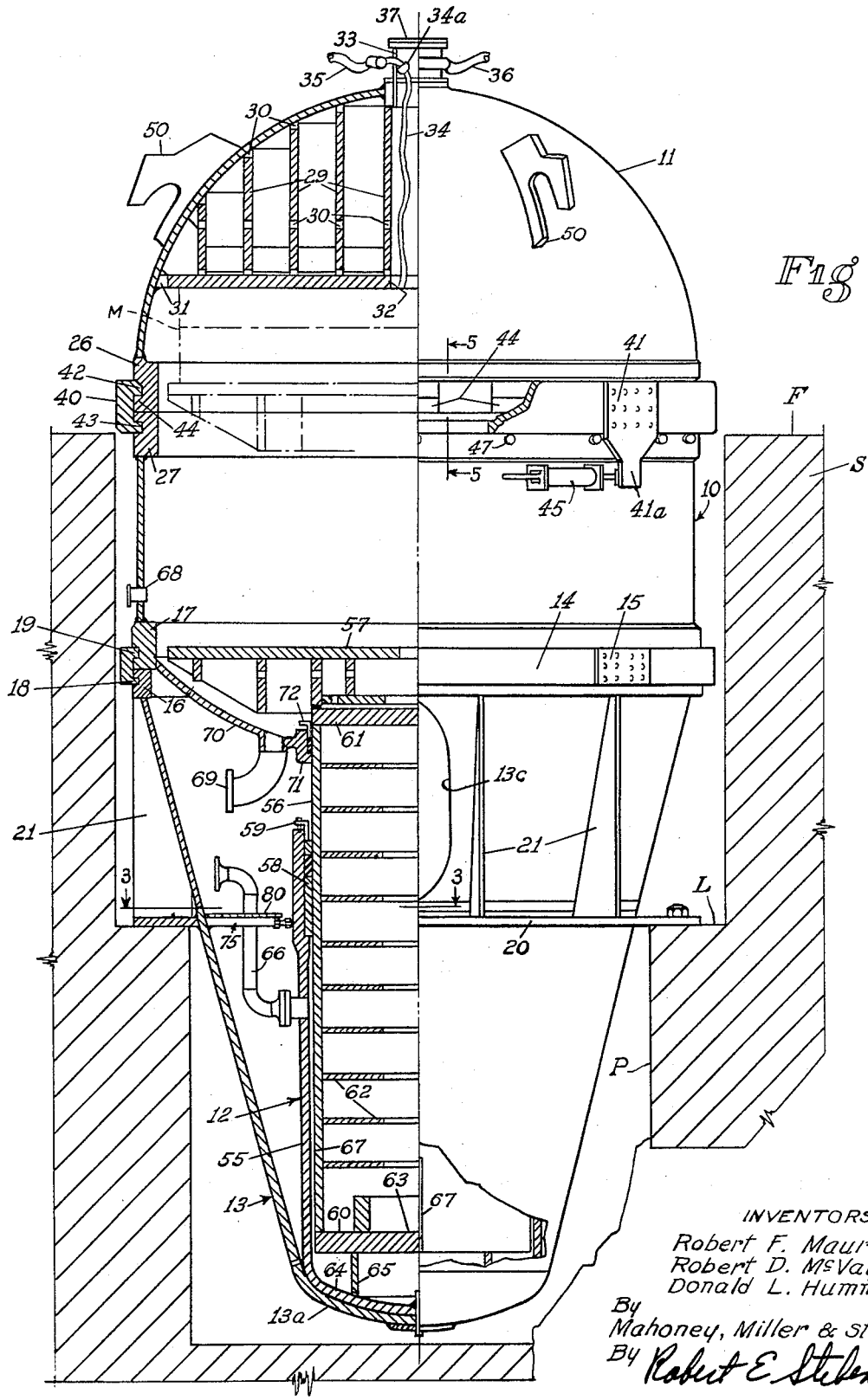

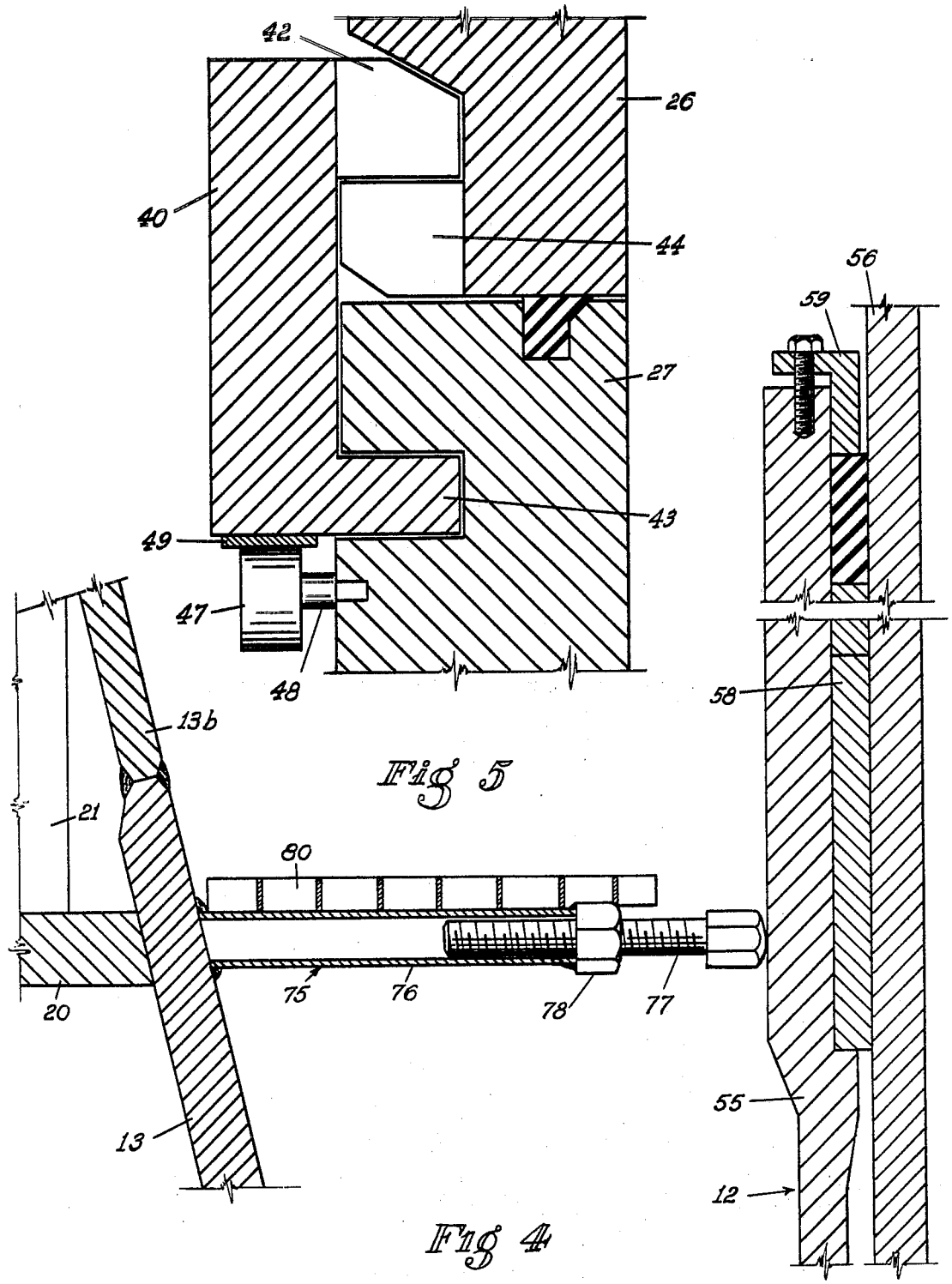

United States Patent Office 3,669,581
Patented June 13, 1972

3,669,581
MOLD PRESS FOR TIRE CURING APPARATUS
Robert F. Maurer and Robert D. McVay, Columbus, and Donald L. Hummel, Canton, Ohio, assignors to United McGill Corporation, Columbus, Ohio
Filed Jan. 8, 1971, Ser. No. 105,035
Int. Cl. B29h 5/20
U.S. Cl. 425—34
9 Claims

ABSTRACT OF THE DISCLOSURE

A tire curing apparatus of the pot-heater type is provided with a mold-press construction incorporating a conically shaped shell for support of a fluid-ram assembly which results in a substantial reduction in the total weight of the apparatus without a corresponding decrease in the structural strength. The frusto-conically shaped shell and ram assembly are cooperatively configured to provide a single-point suspension for the ram-assembly which uniformly distributes stress forces throughout the structure and facilitates precise alignment of the ram assembly with the press body.

BACKGROUND OF THE INVENTION

This invention is specifically directed to apparatus designed for utilization in the tire industry for curing or vulcanizing of tires with the specific apparatus generally referred to as a "pot heater" for the particular purpose of curing the extremely large size tires designed for off-the-road use as in the construction and mining industries. Prior art apparatus for this particular purpose is generally of the type having two opposed heads interconnected by tie-rods with compressive mold force being applied by a ram assembly that is secured to one of the heads and is provided with a movable head or bolster. Molds containing built-up tires are then positioned between the heads and subjected to an appropriately elevated temperature to effect the vulcanizing or curing process while a compressive force is concurrently applied by the ram assembly.

The apparatus of this invention is designed to enable the tire industry to fabricate tires substantially increased in size from that heretofore possible with the prior art apparatus. As an example, the specifically designed apparatus disclosed herein is capable of handling tires of the order of 17 feet in diameter although the principles of construction disclosed herein are adaptable to further increase in size capability of the curing apparatus as well as a decrease to accommodate a tire size range of 96"–300". The known prior art apparatus utilizes a construction requiring relatively large-dimensioned components and structural elements to withstand the mechanical stresses imposed while being effective in performing the curing operation. This prior art construction technique utilizing the massive tie-rods for interconnecting the heads and also, in some instances, supporting and connecting the ram assembly to one of the heads, has been a limiting factor in the maximum size or capability of such prior art apparatus. Utilization of the prior art techniques of construction are an economically limiting factor on the maximum size of curing apparatus, such as a pot heater, which has been practical heretofore.

BRIEF DESCRIPTION OF THE INVENTION

A tire curing apparatus or pot heater embodying this invention comprises a main press body, a removable, domed head assembly positionable on and mechanically interengageable with the upper end of the press body, a fluid ram assembly carrying a bolster relatively movable to the upper head assembly and a frusto-conically-shaped support shell for the ram assembly. The main press body is cylindrically shaped and the head assembly is readily removable for insertion and removal of the tire molds. The frusto-conical ram support shell is designed to be suspended in inverted relationship from the main press body supports the ram assembly at an effective single point along a vertically aligned axis. Utilization of a frusto-conical shell for suspension and support of the ram assembly relative to the press body and head assembly effects a substantial reduction in the quantity of structural steel required for fabrication of a tire curing apparatus capable of accommodating molds for tires in the size range of 96"–300". The effective single point suspension of the ram assembly from the bottom end results in a uniform distribution of stress around the outer periphery of the main press body resulting from the application of mechanical forces during a curing operation and also facilitation of alignment of the ram assembly during erection and assembly of tire curing apparatus. This construction frees the ram casing from all longitudinal stress during operation other than its own weight and will minimize strains in the bronze bushing between the ram casing and the ram. All of the vertical ram force is distributed through the conical section to the outer periphery of the main press body.

These and other objects and advantages of this invention will be readily apparent from the following detailed description of a preferred embodiment of the invention; and the accompanying drawings:

IN THE DRAWINGS

FIG. 1 is a vertical elevational view partly in section, embodying this invention in a tire curing apparatus or pot heater.

FIG. 4 is a fragmentary vertical sectional view on an enlarged scale taken along line 4—4 of FIG. 3.

FIG. 5 is a fragmentary, vertical sectional view on an enlarged scale taken on radially oriented plane passing through line 5—5 of FIG. 1 showing in greater detail the locking ring assembly for securing together the head assembly and the main press-body.

Figure 3:
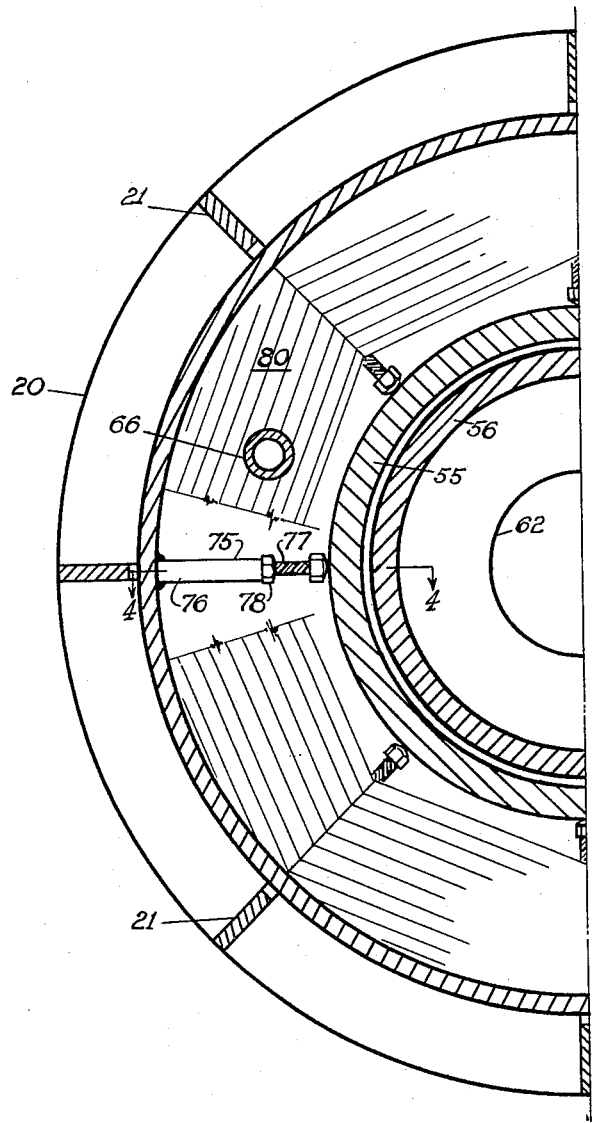
FIG. 3 is a horizontal sectional view taken along line 3—3 of FIG. 1.

A tire-curing apparatus with a mold-press construction embodying this invention is specifically illustrated in FIG. 1 of the drawings. The illustrated apparatus comprises four main sections designated generally as the main press-body or shell 10, head assembly 11, ram assembly 12 and frusto-conical shell 13. These main sections may be fabricated in smaller units or subassemblies to facilitate transportation and subsequent assembly, especially in the case of relatively large capacity apparatus such as of the order of 300". However, when finally assembled in its complete form for utilization in curing of tires, the apparatus is as shown in FIG. 1 with only the head assembly 11 being readily removable from the remainder of the apparatus for insertion and removal of molds and associated tires. In order to better demonstrate the problems involved and the objectives achieved with the inventive structure, the dimensions of a unit capable of handling tires of the order of 17 feet diameter may be of the order of a vertical fifty-foot dimension and about twenty-three feet in diameter as at the mold floor and capable of applying a net pressing force of 9100 tons. The structure is fabricated from steel having a total weight of approximately 570 tons, but having, or capable of also supporting, an additional 300 tons when considering the tires and molds.

Since the head assembly 11 is removable from the remainder of the assembly for insertion and removal of molds and tires, the apparatus is preferably mounted in a pit-type installation, as is illustrated in FIG. 1. The pit P is formed in a suitable structural foundation F with the upper surface forming a mold floor F which is substantially at the elevation of the line of separation of the head assembly and the main body shell 10. An annular support ledge L is formed at approximately a mid-elevation of the pit P and the entire apparatus is supported on this ledge.

The frusto-conical shell 13 is designed to suspend or support the ram-assembly 12 at an effective single point suspension to facilitate alignment during the assembly operation and to more evenly distribute mechanical stresses during functioning of the apparatus in tire curing operations. Accordingly, the frusto-conical shell which is fabricated from steel plate is disposed in inverted relationship with the apex 13a lowermost. The apex is formed into a domed or belled configuration to closely interfit with an end portion of the ram assembly 12 thus forming an effective single point of suspension. Mechanical press forces developed by the ram assembly are transferred to the conical shell through the single point suspension as substantially only tension forces in a uniform distribution of stress throughout the steelplate that is subsequently transmitted to the upper circular periphery of the shell and then through the main press body in opposing those forces developed in the head assembly 11. In the interest of economy, it will be noted that the upper portion 13b of the shell 13 is formed from relatively thinner steel plate. This reduction in thickness of steel plate results from the uniform distribution of stress throughout a larger diameter annular ring having a cross-sectional area such that the maximum tensile load limit will not be exceeded. Without materially affecting the load capability, four access openings 13c elliptically shaped for optimum stress distribution (only one of which is seen in FIG. 1) are formed in the upper shell portion 13b in uniformly spaced relationship to facilitate assembly of the apparatus and subsequent maintenance. The shell 13 is subjected to substantially only tensile forces in the lowermost portions while the uppermost portion also carries compressive forces since it forms an integral support and mounting ring for the entire assembly.

The upper circular periphery of the shell 13 is secured by a locking ring 14 to the lowermost circular periphery of the main press body 10. The main press body 10 is of cylindrical configuration and forms the major portion of a mold cavity for receiving the molds M utilized in forming the tires. The adjacent peripheral edges of the frusto-conical shell 13 and the main press body 10 are preferably fabricated with enlarged cross-sectional area rims 16 and 17, respectively, for better withstanding the tensile forces as well as compressive forces to which the apparatus is subjected. It will also be noted that the lock ring 14 is fabricated in several segments with adjacent segments mechanically coupled in end-to-end relationship by splice plates 15 during assembly of the apparatus to form a continuous ring. The locking ring 14 is also formed with upper and lower inwardly directed annular flanges 18 and 19 that cooperatively interengage with similarly shaped annular recesses formed in the rims 16 and 17 formed with the frusto-conical shell 13 and the main press body 10.

As previously indicated, the upper portion of the frusto-conical shell 13 also functions as a support ring for the entire apparatus. For this purpose, a support plate 20 of annular ring-shape is secured to the shell and is of a dimension to extend over and rest on the support ledge L of the foundation F. Several vertically oriented ribs 21 are provided to better enable the support plate 20 to sustain the weight of the complete apparatus. These ribs 21 are generally triangularly shaped in conformance with the slope of the conical section and are welded between the outer surface of the shell and the plate 20. The uppermost ends of the ribs 21 are also secured as by welding to the peripheral rim 16 secured to the shell 13. The annular ring and vertical ribs also act as a compression ring on the conical section, resisting the tendency of the cone to pull inward, while the ribs assist in converting the ram load to a vertical plane.

The head assembly 11 comprises a hemispherical shell formed with a reinforcing rim 26 adapted to rest on and be supported by a similar cooperating rim 27 formed about the upper end of the main press body 10. A head plate 28 is disposed within the hemispherical shell 25 a distance upwardly from the reinforcing rim 26 providing additional space in combination with the main press body 10 to enlarge the mold cavity. Reinforcement of the head plate 28 and a more uniform distribution or transmission of mold press forces to the hemispherical shell 25 is effected by a plurality of concentric rings 29 which are coaxially disposed within the space between the head plate and the hemispherical shell 25. Several openings or passages 30 are formed in the concentric rings 29 for better circulation of heating fluid, such as steam, throughout the head assembly. Additionally, passageways or openings 31 are formed at the peripheral interconnecting edge of the head plate 28 with the hemispherical shell 25. The passages 30 and 31 are only shown at one location in the several figures, but it will be understood that there are a plurality of such passages formed around the periphery of this shell and in the concentric rings. The centermost concentric ring 29 also forms a passageway communicating with a coaxial opening 32 formed in the center of the headplate 28 and connecting with a manifold assembly 33 disposed at the uppermost portion of the shell 25. This manifold assembly 33 which includes a vertically oriented, cylindrical tube is designed to provide a convenient means of connecting the tire-forming bladders, not shown, to an external supply of pressurized, heated fluid as by flexible conduits or hoses 34 diagrammatically illustrated in FIG. 1. These flexible hoses 34 are connectable to fittings, preferably of a quick disconnect type 34a, provided in the manifold assembly 33 and there may be more than one hose and connection for communication with supply and return conduit 35 and 36 as is also diagrammatically shown. An access plate or cover 37 which is removably attached to the upper end of the cylindrical portion of the manifold assembly provides access for connection and disconnection of the bladder hoses 34.

A relatively rotatable locking ring 40 is provided for releasably interconnecting the head assembly 11 with the main press body 10. This locking ring 40 is also fabricated in two or more segments that are mechanically interconnected in end-to-end relationship by splice plates 41 to form a continuous ring. This locking ring 40 is also formed with upper and lower inwardly directed angular flanges 42 and 43 that respectively interengage with annular recesses formed in the reinforcing rims 26 and 27. While the flange 43 is continuous in nature and not disengageable from the rim 27 during normal usage of the apparatus, the upper flange 42 is interrupted at spaced intervals to form teeth or lugs that interfit with similarly formed matching teeth or lugs 44 formed about the lower peripheral edge of the rim 26 with portions of two lugs 44 shown in FIG. 1. Rotative displacement of the locking ring 40 an angular distance equal to the angular length of the teeth 44 alternately locks or unlocks the head assembly 11 relative to the main press body 10 permitting the head assembly to be removed for insertion or removal of molds and tires or locked in position for a press operation. Rotation of the locking ring 40 is conveniently effected by means of a plurality of hydraulic cylinder and piston units 45 which, in the particular instance illustrated are four in number although only one can be seen. These units 45 have one end of the cylinder mechanically coupled with the main press body 10, while the piston rod 46 is coupled with a downwardly projecting lug 41a formed with a respective splice plate 41. A hydraulic control system of well known construction and therefore not shown would be provided and connected with the cylinder and piston units 45 to permit selective operation thereof. A plurality of rollers 47 supported on horizontal stub axles 48 attached to and carried by the peripheral reinforcing rim 27 and angularly spaced about the main press body 10 normally support the locking ring 40 to facilitate rotational movement thereof. These rollers 47 engage respective bearing plates 49 formed on the lower horizontal surface of the locking ring 40.

Formed on the exterior of the hemispherical shell 25 of the head assembly 11 are a plurality of lugs or hooks 50 facilitating engagement with a lifting device such as an overhead traveling crane. These lugs 50, three in number with only two shown in FIG. 1, are equiangularly spaced about the hemispherical shell and are adapted to interengage with a sling-type lifting device.

The ram assembly 12 includes a vertically oriented, elongated ram casing 55 and ram 56. The upper end of the ram casing is open and the ram 56 is slideable along a vertical axis carrying at its upper end a bolster table 57. The bolster table 57 is also of circular configuration and is movable within the cylindrical main press shell 10, as indicated in FIG. 1, for support of the tire molds M of known prior art construction. A guide bearing or bushing 58 is installed in the upper end portion of the casing 55 with the casing being sealed relative to the ram 56 against hydraulic fluid pressures by a packing gland assembly 59 which is preferably fabricated in spliced segments to permit replacement and repair of the gland and packing without removal of the ram. As can be readily seen in FIG. 1, the ram 56 is of a welded fabrication comprising an elongated cylindrical tube sealed at both ends by end plates 60 and 61 and having a plurality of annular rings 62 welded at axially spaced intervals throughout the interior for increasing the strength of the ram. Additionally, an annular ring 63 is welded to the interior face of the lowermost end plate 60 to further enhance the capability of the ram end plate 60 to withstand the hydraulic forces encountered during a press cycle.

Figure 2:
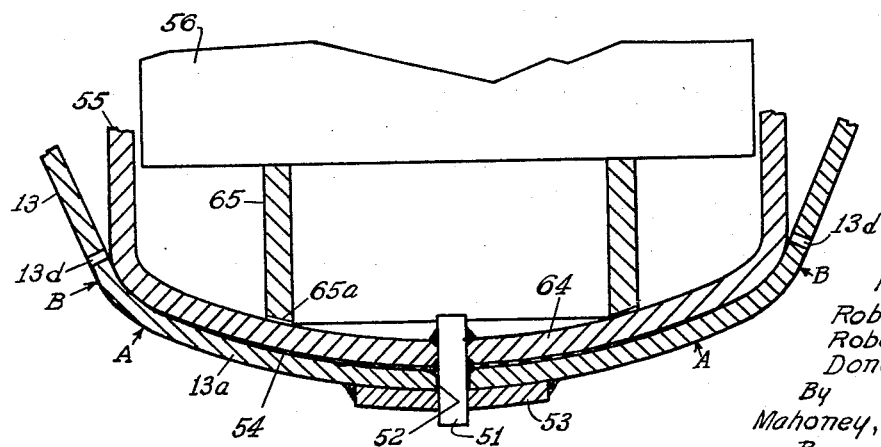
FIG. 2 is a vertical sectional view on an enlarged scale of the lowermost portion of the frusto-conical shell and ram assembly.

The lower end of the ram casing 55 terminates in an end cap 64 of domed or belled configuration, as can be best seen in FIG. 2 and is machined to closely interfit with the apex 13a of the frusto-conical shell 13. The configuration of these two mating components may be best described as ellipsoidal with that portion between points A—A having a relatively large radius of curvature compared to the radius of curvature from point A to point B where the ram casing 55 and the frusto-conical shell 13 become divergent. A centering pin 51 is secured to the center of the end cap 64 of the ram casing and projects through a central aperture 52 formed in the apex 13a of the frusto-conical shell 13 when assembled. A reinforcing plate 53 is welded to the outer surface of the apex 13a surrounding the aperture 52. In assembling the ram casing 55 with the shell 13, a layer 54 of asphaltic material is preferably applied between the interfitting surfaces to prevent accumulation of moisture that may induce rusting. Several fluid escape holes 13d for the same purpose may be formed in the shell at the point of divergence of the shell and ram casing 55. A circular ring 65 is welded to the interior of end cap 64 in concentric relationship to the cylindrical portion of the ram casing 55 and functions as a stop for the ram 56. The lower edge of the ring 65 does not form a fluid seal at its juncture at the interior surface of the end cap 64 and preferably provides a plurality of passageways 65a for circulation of the hydraulic fluid thereby to enable the fluid to act on substantially the entire surface of end plate 60 of the ram 56 when the ram is in engagement with the ring 65.

A combined fluid inlet and outlet conduit 66 is provided for connecting the ram assembly with a suitable source of hydraulic fluid. This conduit 66 may be connected to the ram casing 55 at a point adjacent the upper end and immediately below the guide bushing 58 for convenience of installation. There is an annular space between the ram 56 and interior surface of the ram casing 55 through which the hydraulic fluid may readily circulate. A source of pressurized hydraulic fluid is not shown; however, it will be understood that this source would comprise a suitable fluid pump and motive power mechanism utilizing well known components. As a safety feature, several elongated grooves 67, four in number in this illustrated example, are formed in the exterior surface of the ram 56. These grooves 67 extend a distance upwardly from the lowermost end and are dimensioned as to length so that when the ram 56 is in its maximum upper limit of travel, the upper end of the grooves will project above the packing gland while the lower ends will be below the packing gland and guide bearing 58 thus permitting hydraulic fluid to escape from the ram casing. Assuming that the source of hydraulic fluid is limited as to rate of fluid flow in accordance with the flow-rate capicity of the grooves 67, the ram 56 will not be completely ejected from the ram casing 55 should the head assembly 11 be removed or if the molds M not be disposed within the mold cavity so as to limit the approach of the bolster table 57 to the head plate 28.

Since the vulcanizing or tire curing process also requires the application of heat in order to elevate the temperature of the raw rubber to a point where vulcanization occurs, a source of heat is also provided. In this instance, the source of heat comprises a steam source which is not otherwise shown than as a steam inlet 68 secured in the side wall of the press body 10 and a condensate outlet 69. Since the mold cavity is thus a presurized steam vessel, the main press body 10 is provided with a lower segmental wall section 70 that is secured to the reinforcing rim 17 and is belled downwardly, terminating in a circular ring 71 disposed around the ram 56. This ring 71 is preferably provided with a steam packing gland 72. Locating the steam condensate outlet 69 at a lowermost point of the wall section 70 adjacent the ring 71 assures removal of any condensate that may be formed.

Assembly of the ram assembly 12 with the frusto-conical shell 13 and main press body 10 is facilitated by the single point suspension of the ram casing 55 without rigid interconnection thereby enabling the upper end of the casing to be laterally displaced in properly aligning the axis of the ram assembly with the circular ring 71 in the bottom of the main press body 10. Lateral displacement of the ram casing 55 with subsequent retention in the desired location is facilitated by a plurality of screw-jack assemblies 75, eight in number, positioned about the shell 13 at the level of the support ring 20 in equiangular relationship. Each screw-jack assembly 75 comprises a tubular strut 76 disposed in a horizontal plane and aligned with a radial with the one end rigidly welded to the interior wall of the shell 13. A relatively adjustable screw 77 projects outward from the tubular strut with the outer end thereof bearing against the wall of the ram casing 55. Extension or retraction of the screw 77 is effected by rotation of the screw in a threaded nut 78 welded to the end of the strut 76. Cooperative adjustment of the screws 77 results in proper positioning of the upper end of the ram casing 55 at which time the screws 77 may be fixed in the nuts 78 to prevent subsequent rotation. A circular walkway 80 formed from a metal grating may be supported on the struts 76 to facilitate assembly and subsequent inspection of the packing gland assembly 59.

Figure 6:
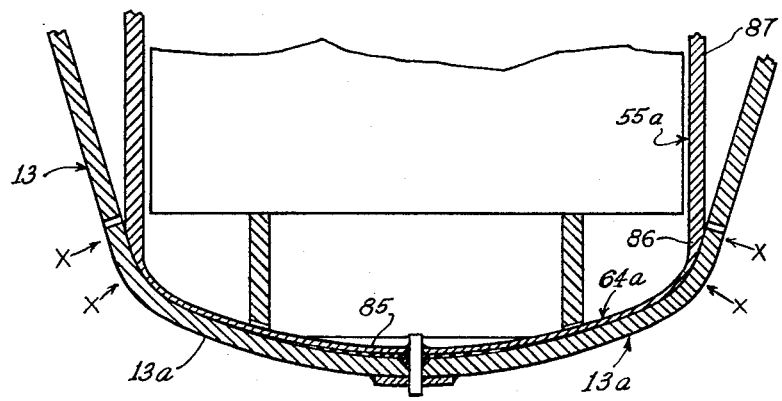
FIG. 6 is a vertical sectional view similar to FIG. 2 of a modified structure.

A modified ram casing construction is illustrated in FIG. 6 with this modified construction reducing the machining and material required as compared with the construction illustrated in FIG. 2 and previously described. In this modified construction, the end cap 64a comprises a relatively thinner central portion 85 terminating in an annular ring portion 86 that merges into the cylindrical side wall 87 of the ram casing 55a and which increases in thickness to that of the side wall while retaining the ellipsoidal configuration. The thickness of the central portion 85 is limited to that where this portion remains relatively flexible, taking into consideration the high fluid pressure forces that are developed during a press cycle as well as the actual structural weight, and will act as a diaphragm that readily conforms to the configuration of the interior surface of the conical shell apex 13a. Fluid pressure forces developed within the ram casing 55a are transferred to the shell apex 13a through the diaphragm-like central portion 85 thus substantially reducing the structural strength requirements of this part of the ram casing. This end cap 64a may be fabricated by welding the thin central portion 85 to the relatively thick portion of the ram casing 55a.

The cylindrical side wall 87 of the ram casing 55a is required to have a structural strength capable of withstanding the fluid pressure forces that may be developed and the transistion annular ring portion 86 must also be capable of withstanding the same fluid pressure forces. As a consequence of its greater thickness, this ring portion 86 is not readily flexible or deformable in conformity to the shell apex 13a and this ring portion, defined as extending between points X, X, must be machined to closely interfit with an opposed annular ring surface of the shell apex that must also be machined. This annular ring portion effectively forms a seal relative to the central portion 85 which is flexible as a diaphragm and serves as the point where structural weight of the ram casing is transmitted to the shell apex 13a. A substantial saving is thus obtained by the reduction of the steel required and by the reduction in machining to achieve the interfitting configuration as compared to the previously illustrated and described structure.

It will be readily apparent from the foregoing detailed description of a tire curing apparatus embodying this invention that a noivel mold press construction is provided. Utilization of a frusto-conical shell for single point suspension of a ram assembly results in a minimum structural weight for a given required strength. This construction also facilitates assembly of the apparatus in enabling precise alignment of components. This design provides an even distribution of loads and several machined reference points provide accurate alignment of mating sections.

Having thus described this invention, what is claimed is:
1. A mold-press comprising
 a head assembly inclduing a head plate
 a bolster table disposed beneath and movable relative to said head plate for application of compressive force to mold structures interposed therebetween;
 a fluid ram assembly coupled with said bolster table and positioned to vertically displace said bolster table toward said head plate, said ram assembly including a ram and an elongated, vertically disposed, ram casing having the lower end thereof closed with an end cap and forming a bearing surface, and
 a frusto-conical shell disposed in inverted position beneath said head assembly and mechanically coupled therewith and including an apex portion closing the lower end thereof with said apex portion formed with an interior surface complemental to the bearing surface of said ram casing end cap, said shell supporting said ram casing by said apex portion thereby providing an effective single point suspension uniformly transmitting ram force through the upper periphery to the head assembly.

2. A mold-press according to claim 1 wherein said complemental surfaces of said ram-casing end-cap and said shell apex portion are of an ellipsoidal configuration with said end cap being structurally rigid.

3. A mold-press according to claim 1 wherein said complemental surfaces of said ram-casing end-cap and said shell apex portion are relatively movable.

4. A mold-press according to claim 1 wherein said frusto-conical shell is provided with means interengageable with said ram casing at a point upwardly spaced from the lower end and selectively operable to laterally displace said ram assembly at said upper end relative to said shell to effect proper alignment of the longitudinal axis of said ram assembly.

5. A mold-press according to claim 1 which includes a cylindrical main press body releaseably interengageable with and adapted to support said head assembly thereon and wherein frusto-conical shell terminates at the upper end thereof in a circular rim for support of said main press body thereon and mechanically coupled with said main press body.

6. A mold-press according to claim 1 wherein said frusto-conical shell terminates at the upper end in a circular rim and is provided with a support and mounting ring, said ring being rigidly secured to said shell at a point below said rim.

7. A mold-press according to claim 6 which includes a plurality of vertically disposed reinforcing ribs angularly spaced apart around said shell and rigidly secured to said ring and to said shell intermediate said ring and said rim.

8. A mold-press according to claim 1 wherein said ram casing is free of longitudinal pressure and mechanical load stresses.

9. A mold-press according to claim 1 wherein said ram-casing end-cap includes a central portion that is relatively flexible and a circumferential annular ring portion that is structurally rigid with said annular ring portion transmitting substantially only mechanical forces to said shell apex portion.

References Cited
UNITED STATES PATENTS

| | | | |
|---|---|---|---|
| 1,100,934 | 6/1914 | Williams | 18—17 A |
| 1,118,503 | 11/1914 | McLeod | 18—6 T |
| 1,362,189 | 12/1920 | Rose | 18—6 T X |
| 1,408,678 | 3/1922 | Ayres | 18—17 A X |
| 1,587,543 | 6/1926 | Midgley | 18—17 A X |
| 2,015,855 | 10/1935 | Kerr | 18—17 C |
| 2,254,415 | 9/1941 | Boyd et al. | 18—7 X |
| 2,324,991 | 7/1943 | Groncy | 18—17 A UX |
| 2,254,415 | 9/1941 | Boyd et al. | 18—17 A |
| 2,979,775 | 4/1961 | White | 18—17 A X |

FOREIGN PATENTS

| | | | |
|---|---|---|---|
| 62,099 | 4/1944 | Denmark | 18—17 A |
| 396,585 | 6/1924 | Germany | 18—17 A |

J. HOWARD FLINT, Jr., Primary Examiner

U.S. Cl. X.R.
425—40